US012631543B2

(12) United States Patent
Tahara

(10) Patent No.: US 12,631,543 B2
(45) Date of Patent: May 19, 2026

(54) OPTICAL FILTER EVALUATION DEVICE, METHOD, AND PROGRAM

(71) Applicant: Sony Group Corporation, Tokyo (JP)

(72) Inventor: Katsutoshi Tahara, Tokyo (JP)

(73) Assignee: Sony Group Corporation, Tokyo (JP)

( * ) Notice: Subject to any disclaimer, the term of this patent is extended or adjusted under 35 U.S.C. 154(b) by 187 days.

(21) Appl. No.: 18/289,155

(22) PCT Filed: Mar. 15, 2022

(86) PCT No.: PCT/JP2022/011532
§ 371 (c)(1),
(2) Date: Nov. 1, 2023

(87) PCT Pub. No.: WO2022/239457
PCT Pub. Date: Nov. 17, 2022

(65) Prior Publication Data
US 2024/0230506 A1      Jul. 11, 2024

(30) Foreign Application Priority Data

May 10, 2021    (JP) ................................. 2021-079759

(51) Int. Cl.
*G01N 15/1429*        (2024.01)
*G01N 15/14*          (2024.01)
            (Continued)
(52) U.S. Cl.
CPC ..... *G01N 15/1429* (2013.01); *G01N 15/1434* (2013.01); *G01N 15/1459* (2013.01);
            (Continued)
(58) Field of Classification Search
CPC ........... G01N 15/1429; G01N 15/1434; G01N 15/1459; G01N 2015/1006; G01N 2015/1402; G01N 2015/1477
See application file for complete search history.

(56) References Cited

U.S. PATENT DOCUMENTS

| | | | | |
|---|---|---|---|---|
| 5,986,767 A | * | 11/1999 | Nakano ..................... | G01J 3/51 |
| | | | | 356/418 |
| 6,809,804 B1 | | 10/2004 | Yount et al. | |

(Continued)

FOREIGN PATENT DOCUMENTS

| | | |
|---|---|---|
| JP | 2005-519309 A | 6/2005 |
| JP | 2005-181145 A | 7/2005 |
| WO | WO 2020/230779 A1 | 11/2020 |

OTHER PUBLICATIONS

Stephen P. Perfetto et al: "Quality assurance for polychromatic flow cytometry using a suite of calibration beads", Nature Protocols, vol. 7, No. 12, Nov. 8, 2012 (Nov. 8, 2012), pp. 2067-2079, XP055603151.

(Continued)

*Primary Examiner* — Georgia Y Epps
*Assistant Examiner* — Erin R Garber
(74) *Attorney, Agent, or Firm* — Wolf, Greenfield & Sacks, P.C.

(57) ABSTRACT

To suppress accuracy deterioration due to an optical filter. An information processing device according to an embodiment includes an irradiation unit (101) that irradiates a sample with light, an optical system (11*a,* 11*b,* 11*c*) that demultiplexes fluorescence from the sample using two or more optical filters, a plurality of photodetectors (12*a,* 12*b*) that detect intensities of the respective pieces of fluorescence demultiplexed by the optical system, and a processing unit (103) that analyzes the sample based on the intensities of the pieces of fluorescence detected by the photodetector respectively. The processing unit determines, based on first light intensities for each of the test samples detected by the photodetector respectively via the optical system when the two or more types of test samples are irradiated with the light from the irradiation unit, whether setting states of the two or more optical filters are appropriate.

14 Claims, 11 Drawing Sheets

(51) Int. Cl.
   *G01N 15/1434* (2024.01)
   *G01N 15/10* (2024.01)

(52) U.S. Cl.
   CPC ................ *G01N 2015/1006* (2013.01); *G01N 2015/1402* (2013.01); *G01N 2015/1477* (2013.01)

(56) References Cited

U.S. PATENT DOCUMENTS

| | | | |
|---|---|---|---|
| 7,482,167 B2 | 1/2009 | Sammak | |
| 2002/0098588 A1* | 7/2002 | Sammak | G01N 21/278 |
| | | | 436/172 |
| 2004/0021078 A1 | 2/2004 | Hagler | |
| 2005/0196778 A1 | 9/2005 | Yamamoto et al. | |
| 2017/0045436 A1* | 2/2017 | Fox | G01N 15/1434 |
| 2021/0293692 A1* | 9/2021 | Shida | G16B 5/00 |
| 2021/0349004 A1* | 11/2021 | Halpert | G01N 15/1425 |

OTHER PUBLICATIONS

International Search Report and English translation thereof mailed Jun. 14, 2022 in connection with International Application No. PCT/JP2022/011532.

International Written Opinion and English translation thereof mailed Jun. 14, 2022 in connection with International Application No. PCT/JP2022/011532.

International Preliminary Report on Patentability and English translation thereof mailed Nov. 23, 2023 in connection with International Application No. PCT/JP2022/011532.

Extended European Search Report issued Sep. 12, 2024 in connection with European Application No. 22807163.5.

* cited by examiner

SortCalBeads

LIGHT INTENSITY

CHANNEL(WAVELENGTH)

| | SortCalBeads (SCB) | AlignCheckBeads (ACB) | Ratio (SCB/ACB) |
|---|---|---|---|
| Height OF Ch1 | 7667 | 820 | 9.35 |
| Height OF Ch2 | 9322 | 747 | 12.48 |

FIG.9

|      | Height_ACB | Height_SCB | ratio | Area_ACB_CV | Area_SCB_CV |
| ---- | ---------- | ---------- | ----- | ----------- | ----------- |
| Ch2  | 85304      | 697077     | 8.17  | 3.6%        | 4.3%        |
| Ch3  | 94010      | 739866     | 7.87  | 3.9%        | 4.2%        |
| Ch4  | 48667      | 740270     | 15.21 | 4.4%        | 4.6%        |
| Ch5  | 71167      | 732467     | 10.29 | 4.4%        | 5.8%        |
| Ch6  | 64172      | 673168     | 10.49 | 4.3%        | 5.4%        |

FIG.10

|      | Height_ACB | Height_SCB | ratio | Area_ACB_CV | Area_SCB_CV |
| ---- | ---------- | ---------- | ----- | ----------- | ----------- |
| Ch2  | 73035      | 753631     | 10.32 | 6.4%        | 4.5%        |
| Ch3  | 94370      | 737893     | 7.82  | 3.2%        | 4.2%        |
| Ch4  | 48498      | 736381     | 15.18 | 3.7%        | 4.3%        |
| Ch5  | 70766      | 723842     | 10.23 | 3.8%        | 4.6%        |
| Ch6  | 64049      | 668573     | 10.44 | 3.9%        | 4.9%        |

FIG.11

| | Height_ACB | Height_SCB | ratio | Area_ACB_CV | Area_SCB_CV |
|------|-----------|-----------|-------|-------------|-------------|
| Ch2 | 92401 | 680224 | 7.36 | 6.7% | 4.4% |
| Ch3 | 93112 | 726538 | 7.80 | 8.0% | 4.1% |
| Ch4 | 47994 | 732339 | 15.26 | 3.6% | 4.1% |
| Ch5 | 71006 | 722608 | 10.18 | 3.6% | 4.5% |
| Ch6 | 66122 | 688634 | 10.41 | 4.3% | 4.9% |

FIG.12

| | Height_ACB | Height_SCB | ratio | Area_ACB_CV | Area_SCB_CV |
|------|-----------|-----------|-------|-------------|-------------|
| Ch2 | 83974 | 706338 | 8.31 | 2.1% | 3.9% |
| Ch3 | 136199 | 725258 | 5.32 | 109.9% | 34.1% |
| Ch4 | 48288 | 739802 | 15.32 | 3.1% | 4.1% |
| Ch5 | 69998 | 723309 | 10.33 | 3.1% | 4.7% |
| Ch6 | 63393 | 668126 | 10.54 | 3.3% | 5.2% |

|  | SLOT A | SLOT B | SLOT C |
|---|---|---|---|
| PATTERN 1 | 585/30 | 565/50 | 561LP |
| PATTERN 2 | 665/30 | 585/30 | 639LP |

OPTICAL FILTER EVALUATION DEVICE, METHOD, AND PROGRAM

CROSS-REFERENCE TO RELATED APPLICATIONS

This application claims the benefit under 35 U.S.C. § 371 as a U.S. National Stage Entry of International Application No. PCT/JP2022/011532, filed in the Japanese Patent Office as a Receiving Office on Mar. 15, 2022, which claims priority to Japanese Patent Application Number JP2021-079759, filed in the Japanese Patent Office on May 10, 2021, each of which is hereby incorporated by reference in its entirety.

FIELD

The present disclosure relates to an information processing device, an information processing method, and a program.

BACKGROUND

There has been flow cytometry as a method for assaying (or analyzing: in the present disclosure, assay includes analysis) proteins of biologically relevant microparticles such as cells, microorganisms, and liposomes. A device used for the flow cytometry is referred to as flow cytometer (FCM). In the flow cytometer, microparticles flowing in a flow channel in a line are irradiated with laser light having a specific wavelength, light such as fluorescence, forward-scattered light, and side-scattered light emitted from the microparticles is converted into an electrical signal by a photodetector and quantified, and a result of the quantification is statistically analyzed, whereby a type, size, structure, and the like of the microparticles are determined.

CITATION LIST

Patent Literature

Patent Literature 1: U.S. Pat. No. 6,809,804

SUMMARY

Technical Problem

A flow cytometer including a plurality of detection systems usually includes a plurality of optical filters. Here, in the case of a flow cytometer capable of changing a wavelength band, it is necessary to manually set an optical filter in predetermined disposition. However, at that time, if an artificial error, a mounting defect, or the like occurs in the setting of the optical filter or the optical filter is, for example, damaged or deteriorated, there arises a problem in that accurate assay or analysis cannot be performed.

Therefore, the present disclosure proposes an information processing device, an information processing method, and a program capable of suppressing deterioration in accuracy due to an optical filter.

Solution to Problem

To solve the problems described above, an information processing device according to an embodiment of the present disclosure includes: an irradiation unit that irradiates a sample with light; an optical system that demultiplexes fluorescence from the sample using two or more optical filters; a plurality of photodetectors that detect intensities of respective pieces of fluorescence demultiplexed by the optical system; and a processing unit that analyzes the sample based on the intensities of the pieces of fluorescence detected by the photodetector respectively, wherein the processing unit determines, based on first light intensities for each of the test samples detected by the photodetector respectively via the optical system when the two or more types of test samples are irradiated with the light from the irradiation unit, whether setting states of the two or more optical filters are appropriate.

BRIEF DESCRIPTION OF DRAWINGS

FIG. 9 is a diagram illustrating level ratios and CVs acquired when setting states of filters are normal under measurement conditions illustrated in FIG. 8.

FIG. 10 is a diagram illustrating an example of a level ratio and a CV set as references in the verification according to the first embodiment of the present disclosure.

FIG. 11 is a diagram illustrating an example of a level ratio and a CV acquired in a case 1 of the verification according to the first embodiment of the present disclosure.

FIG. 12 is a diagram illustrating an example of a level ratio and a CV acquired in a case 2 of the verification according to the first embodiment of the present disclosure.

DESCRIPTION OF EMBODIMENTS

Figure 1:
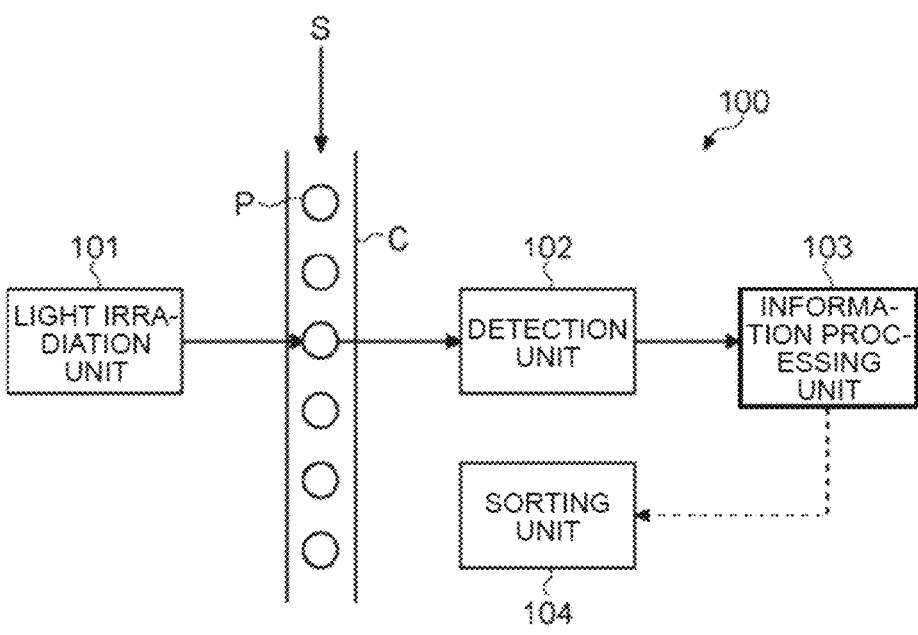
FIG. 1 is a schematic diagram illustrating a configuration example of a biological sample analysis device that is an example of an information processing system according to a first embodiment of the present disclosure.

Embodiments of the present disclosure are explained in detail below with reference to the drawings. Note that, in the embodiments explained below, redundant explanation is omitted by denoting the same parts with the same reference numerals and signs.

The present disclosure is explained according to the item order described below.

0. Introduction
1. First Embodiment
1.1 System configuration example of a biological sample analysis device
1.2 Schematic configuration example of an optical system
1.3 Example of a test sample
1.4 Schematic example of a verification procedure
1.5 Example of a level ratio set as a reference
1.6 Method for verifying a setting state of a mounted optical filter
1.6.1 Verification flow example
1.6.1.1 First example
1.6.1.2 Second example
1.7 Specific example of a verification result
1.7.1 Case 1
1.7.2 Case 2
1.7.3 Case 3
1.8 Summary
2. Second Embodiment
2.1 Overall flow
3. Third Embodiment
4. Modifications
5. Hardware configuration

0. Introduction

A flow cytometer has detection optics. Usually, fluorescence radiated from a sample is demultiplexed or limited in wavelength for each wavelength by an optical filter disposed on an optical path on which the fluorescence propagates. Finally, the fluorescence is finally detected by an optical device such as a photomultiplier tube (PMT) or a photodiode (PD).

Here, when there are a plurality of detection systems are present a device, a plurality of optical filters are also required. In the case of specifications that can change a wavelength band of fluorescence set as an analysis target, it is necessary to remove, insert, or replace the optical filter from the outside. However, in a process of setting the optical filter, it is likely that application of the optical filter is erroneously made because of an artificial error. It is also likely that a mounting defect or the like in which the optical filter is not correctly mounted occurs.

As explained above, if the optical filter is not correctly set, the fluorescence radiated from the sample cannot be correctly measured, which makes it difficult to perform accurate assay and analysis. When the optical filter is damaged or when optical characteristics have changed because of aged deterioration or the like, the fluorescence radiated from the sample cannot be correctly measured and accurate assay or analysis can be difficult.

As a method of confirming whether the optical filter is set in correct disposition, for example, a method of attaching an RFID (Radio Frequency Identifier) to the optical filter and detecting which optical filter is disposed in which position is conceivable. However, in such a method, there is a problem in that, when detection accuracy is deteriorated because, for example, the optical filter is not inserted to a correct position or characteristics of the optical filter are deteriorated, it cannot be specified what is a cause.

Therefore, in the embodiments explained below, there are proposed an information processing system, an information processing method, and a program capable of suppressing deterioration in detection accuracy due to an optical filter such as a setting mistake of the optical filter or damage or deterioration of the optical filter to thereby suppress deterioration in accuracy of assay and analysis.

Specifically, in the embodiment explained below, a setting state of the optical filter is detected and it is determined, based on the obtained setting state, for example, whether the optical filter is correctly set and whether the characteristics of the optical filter have changed because of damage, contamination, aged deterioration, or the like. The setting state of the optical filter referred to therein may be, for example, whether the optical filter is set in correct disposition, whether the optical filter is inserted to a correct position, whether the direction of the optical filter is correct, whether the characteristics of the optical filter have changed because of damage, contamination, aged deterioration, or the like.

1. First Embodiment

An information processing system, an information processing method, and a program according to a first embodiment of the present disclosure are explained in detail below with reference to the drawings.

1.1 System Configuration Example of a Biological Sample Analysis Device

A configuration example of a biological sample analysis device, which is an example of an information processing system according to the present embodiment, is illustrated in FIG. 1. A biological sample analysis device 100 illustrated in FIG. 1 includes a light irradiation unit 101 that irradiates a biological sample S flowing on a flow channel C with light, a detection unit 102 that detects light generated by the irradiation, and an information processing unit (simply referred to as processing unit as well) 103 that processes information concerning the light detected by the detection unit 102. Examples of the biological sample analysis device 100 include a flow cytometer and an imaging flow cytometer. The biological sample analysis device 100 may include a sorting unit 104 that sorts specific bioparticles P in the biological sample S. Examples of the biological sample analysis device 100 including the sorting unit 104 include a cell sorter.

(Biological Sample)

The biological sample S may be a liquid sample containing bioparticles P. The bioparticles P are, for example, cells or non-cellular bioparticles. The cells may be living cells and more specific examples the cells include blood cells such as red blood cells and white blood cells and germ cells such as sperms and fertilized eggs. The cells may be directly collected from a specimen such as whole blood or may be cultured cells acquired after culturing. Examples of the non-cellular bioparticles include extracellular vesicles, particularly, exosomes and microvesicles. The bioparticles P may be labeled with one or more labeling substances (for example, a dye (particularly, a fluorescent dye) and a fluorescent dye labeled antibody). Note that the biological sample analysis device 100 of the present disclosure may analyze particles other than the bioparticles or may analyze beads or the like for calibration or the like.

(Flow Channel)

The flow channel C can be configured such that the biological sample S flows, in particular, a flow in which the bioparticles P contained in the biological sample S are arranged substantially in a row is formed. The flow channel structure including the flow channel C may be designed such that a laminar flow is formed and, in particular, is designed such that a laminar flow in which the flow of the biological sample S (a sample flow) is wrapped by a flow of sheath liquid is formed. The design of the flow channel structure may be appropriately selected by those skilled in the art or a known flow channel structure may be adopted. The flow channel C may be formed in a flow channel structure such as a microchip (a chip including a flow channel in micrometer order) or a flow cell. The width of the flow channel C is 1 mm (millimeter) or less and may be, in particular, 10 μm (micrometer) or more and 1 mm or less. The flow channel C and the flow channel structure including the flow channel C may be formed of a material such as plastic or glass.

The device of the present disclosure may be configured such that the biological sample S flowing in the flow channel C, in particular, the bioparticles P in the biological sample S are irradiated with light from the light irradiation unit 101. The device of the present disclosure may be configured such that an irradiation point (Interrogation Point) of light with respect to the biological sample S is present in the flow channel structure in which the flow channel C is formed or may be configured such that the irradiation point of light is present outside the flow channel structure. Examples of the former can include a configuration in which the flow channel C in the microchip or the flow cell is irradiated with the light. In the latter, the bioparticles P after exiting the flow channel structure (in particular, a nozzle section thereof) may be irradiated with the light. Examples of the latter can include a flow cytometer of a jet in air type.

(Light Irradiation Unit)

The light irradiation unit 101 includes a light source unit that emits light and a light guide optical system that guides the light to the flow channel C. The light source unit includes one or a plurality of light sources. A type of the light source can be, for example, a laser light source or an LED (Light Emitting Diode). A wavelength of light emitted from the light sources may be a wavelength of any one of ultraviolet light, visible light, or infrared light. The light guide optical system includes an optical component such as a beam splitter group, a mirror group, or an optical fiber. The light guide optical system may include a lens group for condensing light and can include, for example, an objective lens. The biological sample S may be irradiated with light at one or more irradiation points. The light irradiation unit 101 may be configured to condense light irradiated from one or a plurality of different light sources with respect to one irradiation point.

(Detection Unit)

The detection unit 102 includes at least one photodetector that detects light generated by light irradiation of particles by the light irradiation unit 101. Light to be detected is, for example, fluorescence, scattered light (for example, any one or more of forward-scattered light, backscattered light, and side-scattered light), transmitted light, or reflected light. Each photodetector includes one or more light receiving elements and includes, for example, a light receiving element array. Each photodetector may include, as the light receiving elements, one or a plurality of photodiodes such as photomultiplier tubes (PMTs) and/or APDs (Avalanche Photodiodes) and MPPCs (Multi-Pixel Photon Counters). The photodetector includes, for example, a PMT array in which a plurality of PMTs are arrayed in a one-dimensional direction. The detection unit 102 may include an imaging element such as a CCD (Charge Coupled Device) or a CMOS (Complementary Metal-Oxide-Semiconductor). The detection unit 102 can acquire bioparticle information concerning the bioparticles P with the imaging element.

As explained above, the bioparticle information can include at least one of a bioparticle image of the bioparticles, a feature value of the bioparticles, attribute information of the bioparticles, and the like. The bioparticle image of the bioparticles may include, for example, a bright field image, a dark field image, a fluorescence image, and the like.

The detection unit 102 includes a detection optical system that causes light having a predetermined detection wavelength to reach a photodetector corresponding to the light. The detection optical system includes a spectroscopic unit such as a prism or a diffraction grating or a wavelength separation unit such as a dichroic mirror or an optical filter. The detection optical system may be configured, for example, to spectrally disperse light from the bioparticles P such that light in different wavelength regions is detected by a plurality of photodetectors larger in number than the number of fluorescent dyes. A flow cytometer including such a detection optical system is referred to as spectral flow cytometer. For example, the detection optical system may be configured to separate light corresponding to a fluorescence wavelength region of the fluorescent dyes from light from the bioparticles P and cause a photodetector corresponding to the separated light to detect the separated light.

The detection unit 102 can include a signal processing unit that converts an electric signal obtained by the photodetector into a digital signal. The signal processing unit may include an A/D converter as a device that performs the conversion. A digital signal obtained by the conversion by the signal processing unit can be transmitted to the information processing unit 103. The digital signal can be treated as data concerning light (hereinafter referred to as "optical data" as well) by the information processing unit 103. The optical data may be, for example, optical data including fluorescence data. More specifically, the optical data may be light intensity data and the light intensity may be light intensity data (which may include feature values such as Area, Height, and Width) of light including fluorescence.

(Information Processing Unit)

The information processing unit 103 includes, for example, a processing unit that executes processing of various data (for example, optical data) and a storage unit that stores the various data. When acquiring the optical data corresponding to the fluorescent dyes from the detection unit 102, the processing unit can perform fluorescence leakage correction (compensation processing) on the light intensity data. In the case of the spectral flow cytometer, the processing unit executes fluorescence separation processing on the optical data and acquires light intensity data corresponding to the fluorescent dyes.

The fluorescence separation processing may be performed according to, for example, an un-mixing method described in Japanese Patent Application Laid-open No. 2011-232259. When the detection unit 102 includes an imaging element, the processing unit may acquire form information of the bioparticles P based on an image acquired by the imaging element. The storage unit may be configured to be able to store the acquired optical data. The storage unit may be further configured to be able to store spectral reference data used in the un-mixing processing.

When the biological sample analysis device 100 includes the sorting unit 104 explained below, the information processing unit 103 can execute determination about whether to sort the bioparticles P based on the optical data and/or the form information. The information processing unit 103 controls the sorting unit 104 based on a result of the determination. The bioparticles P can be sorted by the sorting unit 104.

The information processing unit 103 may be configured to be able to output various data (for example, optical data and images). For example, the information processing unit 103 can output various data (for example, two-dimensional plots, spectral plots, and the like) generated based on the optical data. Furthermore, the information processing unit 103 may be configured to be able to receive input of various data and, for example, receives gating processing on a plot by a user. The information processing unit 103 can include an output unit (for example, a display) or an input unit (for example, a keyboard) for executing the output or the input.

The information processing unit 103 may be configured as a general-purpose computer and may be configured as an information processing device including, for example, a CPU (Central Processing Unit), a RAM (Random Access Memory), and a ROM (Read only memory). The information processing unit 103 may be included in a housing including the light irradiation unit 101 and the detection unit 102 or may be present outside the housing. Various kinds of processes or functions by the information processing unit 103 may be realized by a server computer or a Cloud connected via a network.

(Sorting Unit)

The sorting unit 104 can execute sorting of the bioparticles P, for example, according to a determination result by the information processing unit 103. A sorting method may be a method of generating droplets containing the bioparticles P with vibration, applying electric charges to the droplets to be sorted, and controlling a traveling direction of the droplets with an electrode. The sorting method may be a method of controlling the traveling direction of the bioparticles P in a flow channel structure to perform sorting. In the flow channel structure, for example, a control mechanism by pressure (injection or suction) or electric charges is provided. Examples of the flow channel structure include a chip (for example, a chip described in Japanese Patent Application Laid-open No. 2020-76736) including a flow channel structure in which the flow channel C branches into a collection flow channel and a waste liquid flow channel on the downstream side thereof, the specific bioparticle P being collected in the collection flow channel.

1.2 Schematic Configuration Example of an Optical System

Figure 2:
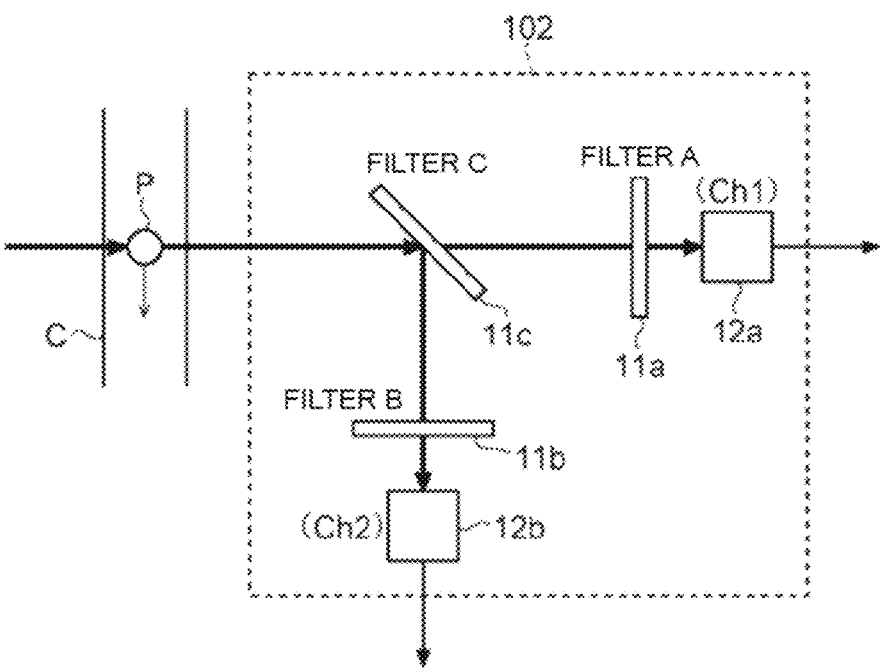
FIG. 2 is a schematic diagram illustrating a schematic configuration example of an optical system according to the first embodiment of the present disclosure.

Subsequently, a schematic configuration example of an optical system in the biological sample analysis device 100 according to the present embodiment is explained. FIG. 2 is a schematic diagram illustrating a schematic configuration example of an optical system according to the present embodiment. However, the optical system illustrated in FIG. 2 is the most simplified optical system. The optical system mounted on the biological sample analysis device 100 may be a more complicated optical system.

As illustrated in FIG. 2, the detection unit 102 of the biological sample analysis device 100 includes, as the optical system, an optical filter (hereinafter simply referred to as filter as well) 11c that demultiplexes light radiated or scattered from the bioparticles P by irradiation of light, a filter 11a that transmits light in a specific wavelength band in light transmitted through the filter 11c, a photodetector 12a that detects the light transmitted through the filter 11a, a filter 11b that transmits light in a specific wavelength band in light reflected by the filter 11c, and a photodetector 12b that detects the light transmitted through the filter 11b.

The filter 11c may be an optical filter that transmits light in a specific wavelength band and reflects light in other wavelength bands such as a dichroic mirror. The filters 11a and 11b may be optical filters that transmit light of a specific wavelength band and reflect light of other wavelength bands.

The photodetector 12a is a photodetector capable of adjusting a gain such as a photomultiplier tube and detects the intensity of light transmitted through the filters 11c and 11a. Similarly, the photodetector 12b is a photodetector such as a photomultiplier tube and detects the intensity of light reflected by the filter 11c and transmitted through the filter 11b.

1.3 Example of a Test Sample

In the present embodiment, two or more types of test samples having different characteristics may be used to detect a setting state of the optical filter. In the present embodiment, examples of the information processing device (a biological sample analysis device) include a flow cytometer. Therefore, check beads having the same size and the same shape as those of microparticles such as cells set as an inspection target by the flow cytometer can be used as test samples. Therefore, in the present embodiment, as the check beads, a case in which AlignCheck beads and SortCal beads are used as setup beads is illustrated.

Figure 3:
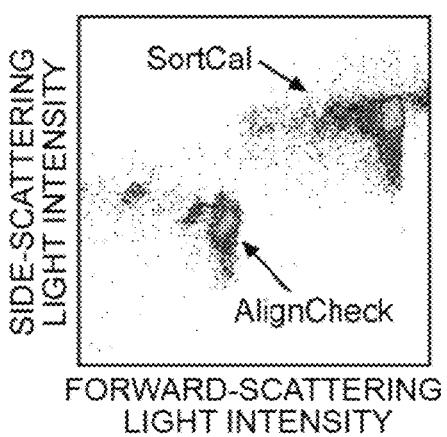
FIG. 3 is a graph illustrating two-dimensional plots of forward-scattered light and side-scattered light respectively scattered by AlignCheck beads and SortCal beads detected by the optical system illustrated in FIG. 2.
Figure 4:
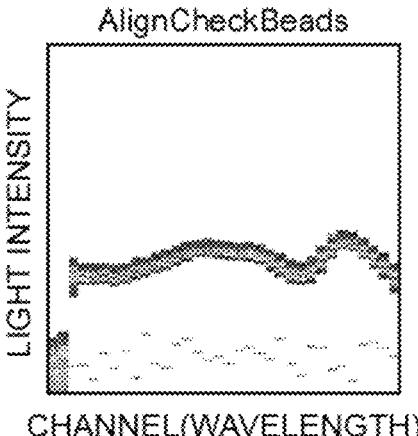
FIG. 4 is a graph illustrating fluorescence spectra of the AlignCheck beads detected by the optical system illustrated in FIG. 2.
Figures 5, 6:
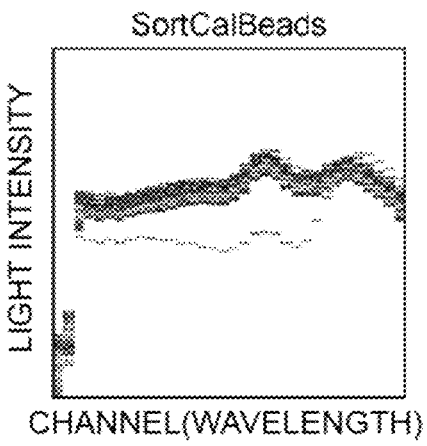
FIG. 5 is a graph illustrating fluorescence spectra of the SortCal beads detected by the optical system illustrated in FIG. 2.
FIG. 6 is a diagram illustrating an example of a level ratio obtained from setup beads when an optical filter is correctly set with respect to the optical system illustrated in FIG. 2.

Characteristics of the AlignCheck beads and the SortCal beads detected by the optical system illustrated in FIG. 2 are illustrated in FIGS. 3 to 5. FIG. 3 is a graph illustrating two-dimensional plots of forward-scattered light and side-scattered light respectively scattered by the AlignCheck beads and the SortCal beads detected by the optical system illustrated in FIG. 2. FIG. 4 is a graph illustrating fluorescence spectra of the AlignCheck beads detected by the optical system illustrated in FIG. 2. FIG. 5 is a graph illustrating fluorescence spectra of SortCal beads detected by the optical system also illustrated in FIG. 2. Note that, in FIG. 3, the horizontal axis indicates the light intensity of the forward-scattered light and the vertical axis indicates the light intensity of the side-scattered light. In FIG. 4 and FIGS. 5, the horizontal axis indicates a channel in the case in which a wavelength band of 400 nm (nanometers) to 800 nm is divided into thirty-two channels and the vertical axis indicates the light intensity of fluorescence detected for each of the channels.

The AlignCheck beads and the SortCal beads have different bead sizes. Therefore, respective fluorescence signals can be separated by using scattering plots illustrated in FIG. 3. That is, as illustrated in FIG. 3, a scattering plot of the AlignCheck beads and a scattering plot of the SortCal beads are distributed in different positions in a two-dimensional graph. Therefore, by gating respective distributions, it is possible to separate an event obtained by the AlignCheck beads and an event obtained by the SortCal beads. This makes it possible to separately extract a fluorescence signal obtained by detecting fluorescence radiated from the AlignCheck beads and a fluorescence signal obtained by detecting fluorescence radiated from the SortCal beads.

Note that the "event" in the present explanation may be a data set including light intensity signals (referred to as fluorescence signals or detection signals as well) of fluorescence, forward-scattered light, and side-scattered light detected by the beads. To associate these signals, time bumps, identification IDs, or the like may be used.

As illustrated in FIGS. 4 and 5, the AlignCheck beads and the SortCal beads show high fluorescence characteristics in a region of 400 nm to 800 nm. Further, in these two beads, wide wavelength bands of fluorescence are wide bands, wavelength spectra thereof are different, and light intensities (hereinafter simply referred to as levels as well) of fluorescence are also different. From the above, it can be said that the AlignCheck beads and the SortCal beads are suitable as test samples. Therefore, in the present embodiment, whether a setting state of the optical filter is appropriate is verified by verifying, using these beads, a level ratio and the like of the fluorescence signals in respective wavelength bands (equivalent to one or two or more channels). However, test samples are not limited to the AlignCheck beads and the SortCal beads and various samples capable of separating observed fluorescence with sufficient accuracy can be used as the test samples. The level ratio to be verified may be a ratio of relative levels of fluorescence signals in the respective wavelength bands or a ratio of absolute levels. When the ratio of absolute levels is used, absolute levels of the fluorescence signals can also be used to determine whether the setting state of the optical filter is appropriate.

1.4 Schematic Example of a Verification Procedure

As a verification procedure in the present embodiment, for example, in the optical system illustrated in FIG. 2, first, a gain of the photodetector 12a is adjusted such that a level of a fluorescence signal obtained from the SortCal beads reaches a specified value in the photodetector 12a. For example, when a photomultiplier tube is used as the photodetector 12a, an HV (High Voltage) to be applied to the photomultiplier tube is adjusted to adjust the level of the fluorescence signal obtained from the SortCal beads reaches the specified value.

Note that the level in the present explanation is a value indicating the light intensity of fluorescence as explained above and may be, for example, amplitude (hereinafter referred to as Height as well) of a fluorescence signal obtained by detecting fluorescence for a certain channel or an average of Height of the fluorescence signals detected for two or more continuous channels.

Subsequently, in the present embodiment, from events of the respective AlignCheck beads and SortCal beads detected by the photodetector 12a, a level ratio of these two types of beads is calculated and the calculated level ratio is evaluated to determine setting states of the filter 11a and the filter 11c, that is, for example, whether the filter 11a and the filter 11c are correctly set or whether the characteristics of the filter 11a and the filter 11c have changed.

For the photodetector 12b, similarly, setting states of the filter 11b and the filter 11c are determined by evaluating a level ratio from gain adjustment.

1.5 Example of a Level Ratio Set as a Reference

The evaluation of the level ratio may be executed based on comparison of a level ratio set as a reference prepared in advance (hereinafter referred to as a reference level ratio) and a level ratio obtained from actual measurement. At that time, as a reference level ratio set as a reference in verifying whether a setting state of the optical filter is appropriate, for example, a level ratio acquired using a test sample in a state in which the optical filter is correctly set with respect to the optical system of the biological sample analysis device 100 may be used. For example, the reference level ratio may be acquired in advance on a provision or maintenance management side of the biological sample analysis device 100 and set in an actual machine or may be acquired and set on the user side.

FIG. 6 illustrates an example of a level ratio obtained when the AlignCheck beads and the SortCal beads are used as test samples and the filters 11a to 11c are correctly set with respect to the optical system illustrated in FIG. 2. Note that, in the present explanation, for example, a case in which a wavelength band of 500 nm to 800 nm is divided into two channels, a short wavelength side is detected by a channel Ch1, and a long wavelength side is detected by a channel Ch2 is illustrated.

As illustrated in FIG. 6, in this example, for example, Height (level) of the SortCal beads in the wavelength band of the channel Ch1 is 7667 and Height (level) of the AlignCheck beads in the same channel band is 820. Therefore, the reference level ratio for the channel Ch1 is calculated as 9.35. Similarly, the reference level ratio for the channel Ch2 is calculated as 12.48.

The level ratio calculated in this way is used, for example, in verifying whether the setting state of the optical filter is appropriate. For example, when, among level ratios (hereinafter referred to as actual measurement level ratios) of channel bands acquired in a state in which the filters 11a to 11c are set with respect to the optical system illustrated in FIG. 2, an actual measurement level ratio of the channel Ch1 is not included in a predetermined range based on a reference level ratio (=9.35) for the same channel Ch1, it can be determined that the setting states of the filter 11a and the filter 11c are not appropriate. Similarly, when an actual measurement level ratio of the channel Ch2 is not included in a predetermined range based on a reference level ratio (=12.48) for the channel Ch2, it can be determined that the setting states of the filter 11b and the filter 11c are not appropriate.

1.6 Method for Verifying a Setting State of a Mounted Optical Filter

Subsequently, a method for verifying whether a setting state of a mounted optical filter is appropriate at a stage of actually using the biological sample analysis device 100 is explained in detail.

The verification of the setting state of the optical filter is performed based on an output obtained by actually flowing beads. In the following explanation, a case in which setup beads including AlignCheck beads and SortCal beads are used is explained as an example.

Here, a composition ratio of the setup beads is Align-Check beads: SortCal beads=1:2. As detection parameters, a coefficient of variation (hereinafter abbreviated as CV) or a robust CV (hereinafter referred to as rCV) is also used in addition to the level ratio of the beads.

When a wavelength band obtained by erroneous insertion of an optical filter or the like changes, the level ratio obtained from the beads changes. When the setting state of the optical filter becomes inappropriate because of erroneous insertion or the like, an amount of incident light on a light detection unit decreases. Consequently, the CV and the rCV are considered to be deteriorated by shot noise. Therefore, more accurate verification can be performed by setting the CV or the rCV as a verification target in addition to the level ratio of the beads.

1.6.1 Verification Flow Example

Subsequently, a verification flow for verifying a setting state of the optical filter is explained. In the present embodiment, verification flows of two patterns are illustrated based on whether the gain of the photodetector is adjustable.

1.6.1.1 First Example

First, as a first example, a verification flow example in the case in which gain adjustment for the photodetector is possible is explained. Note that, as the photodetector capable of performing gain adjustment, for example, a photomultiplier tube and the like can be illustrated.

Figure 7:
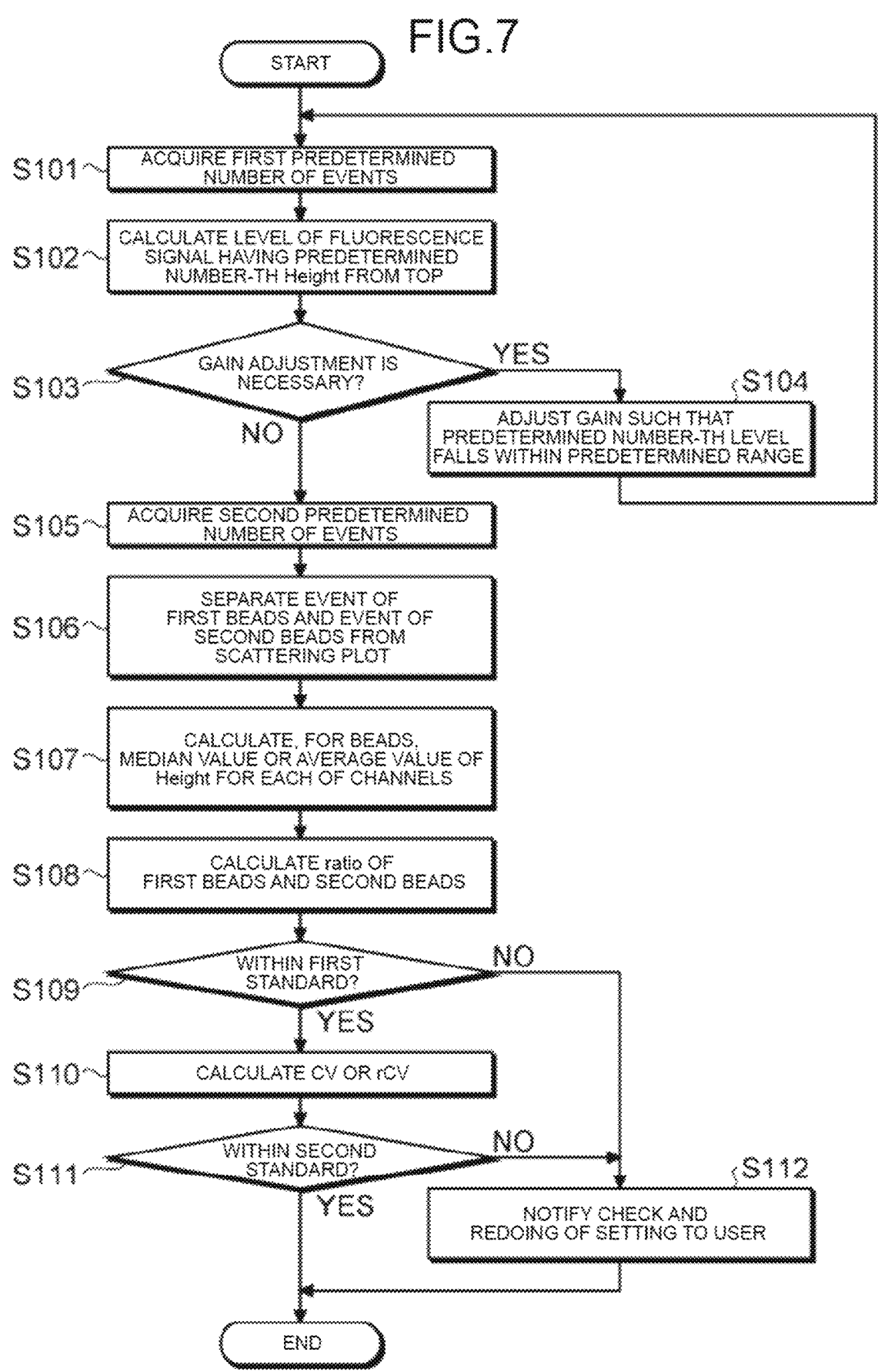
FIG. 7 is a flowchart illustrating an example of a verification flow according to a first example of the first embodiment of the present disclosure.

FIG. 7 is a flowchart illustrating an example of a verification flow according to the first example of the present embodiment. Note that, it is assumed that, before the verification flow illustrated in FIG. 7 is executed, an optical filter corresponding to an analysis target sample different from the setup beads is set in the optical system in the detection unit 102 of the biological sample analysis device 100.

As illustrated in FIG. 7, in this verification flow, first, acquisition of a first predetermined number of (for example, 1000) events is executed (step S101). Specifically, the setup beads are fed to the flow channel C (see FIG. 1) and a set of a fluorescence signal obtained by detecting fluorescence emitted by irradiating the beads flowing on the flow channel C with light from the light irradiation unit 101, a detection signal obtained by detecting forward-scattered light, and a detection signal obtained by detecting side-scattered light is detected as one event. Note that one event may correspond to one bead. The first predetermined number may be, for example, a number that can reduce a statistical error to a certain degree and does not cause an excessive burden as a preparation procedure performed before actual measurement.

Subsequently, the information processing unit 103 of the biological sample analysis device 100 calculates a level of a fluorescence signal having predetermined number-th Height from the top in the event acquired in step S101 (step S102). Here, the predetermined number-th may be, for example, at 10% from the top, that is, when 1000 events are acquired, 100-th from the highest Height. However, not only this, but step S102 may be variously changed if a level serving as a guide for setting an appropriate gain in detection for the setup beads can be specified.

Subsequently, the information processing unit 103 determines, based on the level calculated in step S102, whether gain adjustment for the light detection unit is necessary (step S103). Specifically, for example, the information processing unit 103 determines whether the level calculated in step S102 falls within a predetermined range set in advance and, when the level does not fall within the predetermined range, determines that the gain adjustment is necessary (YES in step S103). On the other hand, when the level falls within the predetermined range, the information processing unit 103 determines that the gain adjustment is unnecessary (NO in step S103). Note that the predetermined range may be, for example, a range of $7 \times 10^5 \pm 10\%$. However, not only this, but the predetermined range may be various changed if the predetermined range is a range of a level in which the detection for the setup beads can be appropriately executed.

When the gain adjustment is necessary (YES in step S103), the gain of the light detection unit is adjusted such that the level calculated in step S102 falls within the predetermined range in step S103 (step S104) and the information processing unit 103 returns to step S101 again and executes the subsequent operations. For example, when the photodetector is a photomultiplier tube, an HV to be applied to the photomultiplier tube may be adjusted in step S104.

When the gain adjustment is unnecessary (NO in step S103), acquisition of a second predetermined number of (for example, 10,000) of events is executed (step S105). An event acquisition method may be, for example, the same as step S101. In addition, the second predetermined number may be, for example, a number that can sufficiently reduce a statistical error.

Subsequently, the information processing unit 103 draws a two-dimensional plot (see, for example, FIG. 3) of the event from a detection signal of forward-scattered light and a detection signal of side-scattered light in the event acquired in step S105 and gates the two-dimensional plot to separately extract an event of the SortCal beads (referred to as first beads as well) and an event of the AlignCheck beads (referred to as second beads as well) (step S106). Note that the gate for the two-dimensional plot may be manually set by the user or may be automatically set by the information processing unit 103.

Subsequently, the information processing unit 103 calculates, for the beads extracted in step S106, a median value or an average value of Height of fluorescence signals for each of channels (step S107) and subsequently calculates a level ratio (a ratio) of Height for each of the channels (step S108). Note that, in this example, a case in which the denominator in calculating a level ratio is a median value or an average value of Height of fluorescence signals of the AlignCheck beads (the second beads) is illustrated. However, not only this, but the denominator may be a median value or an average value of Height of fluorescence signals of the SortCal beads (the first beads).

Subsequently, the information processing unit 103 determines whether the calculated level ratio for each of the channels falls within a preset first standard (step S109). Note that the first standard may be, for example, a range set based on the level ratio for each of the channels acquired in advance (see, for example, FIG. 6). At that time, for example, by setting a range of ±15% of level ratios as the range of the first standard set for the level ratios, it is possible to more appropriately verify propriety of a setting state of the optical filter. However, the first standard is not limited to this value and can be variously changed if the first standard is in a range in which the verification can be appropriately performed.

When the level ratio of each of the channels falls within the first standard (YES in step S109), this operation proceeds to step S110. On the other hand, when the level ratio of each of the channels does not fall within the first standard (NO in step S109), this operation proceeds to step S112.

In step S110, the information processing unit 103 calculates, for the beads extracted in step S106, a CV or an rCV for each of the channels.

Subsequently, the information processing unit 103 determines whether the calculated CV or rCV for each of the beads and each of the channels falls within the preset second standard (step S111). Note that the second standard may be, for example, a range set based on a CV or an rCV for each of the beads and each of the channels acquired in advance. At that time, for example, if a value of the CV or the rCV is 4% or less, the range of the second standard may be a range of ±2% based on the value. On the other hand, when the value of the CV or the rCV is a value larger than 4%, the range of the second standard may be a range of ±3% based on the value. However, the range is not limited to these values and may be variously changed if verification can be appropriately performed. At that time, the range of the second standard may be set considering wavelength regions of the channels.

When the CV or the rCV for each of the beads and each of the channels falls within the second standard (YES in step S111), this operation ends. On the other hand, when the CV or rCV for each of the beads and each of the channels does not fall within the second standard (NO in step S111), this operation proceeds to step S112.

In step S112, the check of the setting state of the optical filter and redoing of the setting of the optical filter are notified to the user. For example, this notification may be provided to the user via a not-illustrated display or speaker included in the information processing unit 103 or may be provided to a mobile terminal of the user in a form of an e-mail, a message, or the like. Note that, after step S112, this operation may be ended or may return to step S101 and the subsequent operations may be executed. When this operation ends, after performing the check of the setting state of the optical filter and the redoing of the setting of the optical filter, the user may execute this operation again from the beginning.

1.6.1.2 Second Example

In a second example, a case in which the gain of the photodetector cannot be adjusted is explained. Note that, as the photodetector, the gain of which cannot be adjusted, for example, a photodiode, an APD (Avalanche Photodiode) and an MPPC (Multi-Pixel Photon Counter) can be illustrated.

A verification flow in the case in which the gain of the photodetector cannot be adjusted may be configured by, for example, the processes in step S105 and subsequent steps in the verification flow according to the first example explained with reference to FIG. 7 while omitting the gain adjustment operation in steps S101 to S104. However, even when a photodiode, an APD, an MPPC, or the like is used, if the gain adjustment is possible, the verification flow according to the first example explained above may be executed. Since the operations in step S105 and subsequent steps may be the same as the operations explained with reference to FIG. 7, a detailed explanation of the operations is omitted here.

1.7 Specific Example of a Verification Result

Subsequently, verification results in the case in which verification is actually performed using the verification flow according to the present embodiment is explained with reference to several specific examples.

Figure 8:
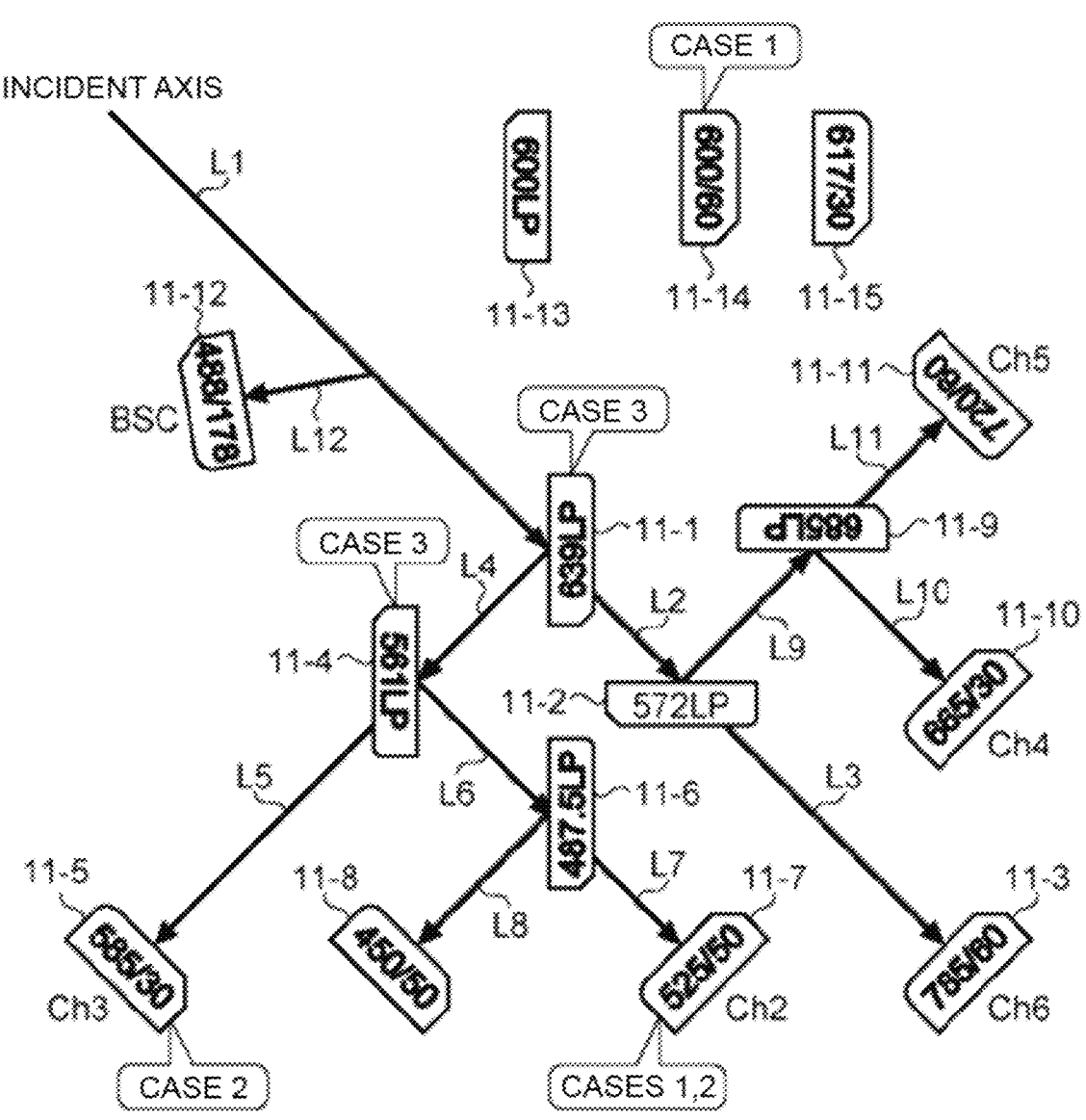
FIG. 8 is a schematic diagram illustrating an example of an optical system in a detection unit of a biological sample analysis device used in verification according to the first embodiment of the present disclosure.

Note that, in this verification, the optical system illustrated in FIG. 8 was used. FIG. 8 is a schematic diagram illustrating an example of an optical system in the detection unit 102 of the biological sample analysis device 100 used in this verification. However, in FIG. 8, photodetectors corresponding to channels are omitted.

In FIG. 8, a filter 11-1 is a long pass filter (LP) that transmits light L2 having a wavelength component of 639 nm or more and reflects light L2 having a wavelength component of less than 639 nm. The filter 11-1 demultiplexes incident light L1 into the light L1 and the light L2.

A filter 11-2 is a long pass filter that transmits light L3 having a wavelength component of 572 nm or more and reflects light L9 having a wavelength component of less than 572 nm. The filter 11-2 demultiplexes the light L2 transmitted through the filter 11-1 into the light L3 and the light L9.

A filter 11-3 is a band pass filter having a bandwidth of 50 nm centered on 785 nm and is disposed on an incident surface of a photodetector, which is a channel Ch6.

A filter 11-4 is a long pass filter that transmits light L5 having a wavelength component of 561 nm or more and reflects light L6 having a wavelength component of less than 561 nm. The filter 11-4 demultiplexes the light L4 reflected by the filter 11-1 into the light L5 and the light L6.

A filter 11-5 is a band pass filter having a bandwidth of 30 nm centered on 585 nm and is disposed on an incident surface of a photodetector, which is a channel Ch3, to limit the wavelength component of the light L5 made incident on the photodetector.

A filter 11-6 is a long pass filter that transmits light L7 having a wavelength component of 487.5 nm or more and reflects light L8 having a wavelength component of less than 487.5 nm. The filter 11-6 demultiplexes the light L6 reflected by the filter 11-4 into the light L7 and the light L8.

A filter 11-7 is a band pass filter having a bandwidth of 50 nm centered on 525 nm and is disposed on an incident surface of a photodetector, which is a channel Ch2, to limit the wavelength component of the light L7 made incident on the photodetector.

A filter 11-8 is a bandpass filter having a bandwidth of 50 nm centered on 450 nm.

A filter 11-9 is a long pass filter that transmits light L11 having a wavelength component of 685 nm or more and reflects light L10 having a wavelength component of less than 685 nm. The filter 11-9 demultiplexes the light L9 reflected by the filter 11-2 into the light L10 and the light L11.

A filter 11-10 is a band pass filter having a bandwidth of 30 nm centered on 665 nm and is disposed on an incident surface of a photodetector, which is a channel Ch4, to limit the wavelength component of the light L10 made incident on the photodetector.

A filter 11-11 is a band pass filter having a bandwidth of 60 nm centered on 720 nm and is disposed on an incident surface of a photodetector, which is a channel Ch5, to limit the wavelength component of the light L11 made incident on the photodetector.

A filter 11-12 is a band pass filter having a bandwidth of 178 nm centered on 488 nm and is disposed on an incident surface of a photodetector for detecting a backscattered light L12 to limit light made incident on the photodetector to the backscattered light L12.

A filter 11-13 is a long pass filter that transmits light having a wavelength component of 600 nm or more and reflects light having a wavelength component of less than 600 nm. A filter 11-14 is a bandpass filter having a bandwidth of 60 nm centered on 600 nm. A filter 11-15 is a bandpass filter having a bandwidth of 30 nm centered on 617 nm. Note that the filters 11-13 to 11-15 are mounted on the detection unit 102 of the biological sample analysis device 100 as spare optical filters.

In this verification, light emitted from the light irradiation unit 101 and applied to the beads flowing on the flow channel C was set to light of 488 nm (corresponding to the wavelength of the backscattered light L12), and using setup beads having a composition ratio of AlignCheck beads: SortCal beads=1:2, gains of the photodetectors were adjusted such that Height at 10% from the top of a fluorescence signal obtained by the SortCal beads fell within a range of $7 \times 10^5 \pm 10\%$. Note that, in the following description, the AlignCheck beads are abbreviated as ACB and the SortCal beads are abbreviated as SCB. A level ratio (a ratio) of the channels was set to (SCB level)/(ACB level).

FIG. 9 is a diagram illustrating Heights, level ratios (ratios), and CVs of the channels acquired when the filters 11-1 to 11-12 are correctly set under the measurement conditions explained above. Note that, in FIG. 9, Height_ACB indicates Height of a fluorescence signal obtained by the AlignCheck beads, Height_SCB indicates Height of a fluorescence signal obtained by the SortCal beads, Area_ACB_CV indicates a CV calculated from a fluorescence signal obtained by the AlignCheck beads, and Area_SCB_CV indicates a CV calculated from the fluorescence signal obtained by the SortCal beads. Among the values illustrated in FIG. 9, the level ratios (the ratios) and the CVs of the channels were used as references (a first regulation and a second regulation) in verifying setting states of the optical filters.

1.7.1 Case 1

In a Case 1, as illustrated in FIG. 8, a case in which the filter 11-7 and the spare filter 11-14 are interchanged is explained. FIG. 10 is a diagram illustrating Heights, level ratios (ratios), and CVs of the channels acquired in the case of the Case 1. As it is seen when FIG. 10 and FIG. 9 are compared, in the Case 1, a value of the level ratio of the channel Ch2 deviates from a first specified range (8.17±15%) calculated from the value illustrated in FIG. 8, similarly, a value of Area_ACB_CV of the channel Ch2 deviates from a second specified range (3.6%±2%) obtained from the value illustrated in FIG. 8, and the other values are included in specified value ranges. From the above, in the Case 1, it can be determined that there is an error in the filter 11-7 disposed immediately before the photodetector of the channel Ch2.

1.7.2 Case 2

In a Case 2, as illustrated in FIG. 8, a case in which the filter 11-5 and the filter 11-7 are interchanged is explained. FIG. 11 is a diagram illustrating Heights, level ratios (ratios), and CVs of the channels acquired in the case of the Case 2. As it is seen when FIG. 11 and FIG. 9 are compared, in the Case 2, values of the level ratios of the channels Ch2 and Ch3 are included in first specified ranges (Ch2: 8.17±15%, Ch3: 7.87±15%) obtained from the values illustrated in FIG. 8. Therefore, it cannot be determined from the level ratios that there is an error in the optical filters disposed on paths of light made incident on the channels. However, values of Area_ACB_CV of the channels Ch2 and Ch3 deviate from second specified ranges (Ch2: 3.6%+2%, Ch3: 3.9%+2%) obtained from the values illustrated in FIG. 8. From the above, in the Case 2, it can be determined that there is an error in at least one of the filters 11-1, 11-4, 11-5, 11-6, and 11-7 disposed on optical paths to the photodetectors of the channels Ch2 and Ch3.

1.7.3 Case 3

In a Case 3, as illustrated in FIG. 8, a case in which the filter 11-1 and the filter 11-4 are interchanged is explained. FIG. 12 is a diagram illustrating Heights, level ratios (ratios), and CVs of the channels acquired in the case of the Case 3. As it is seen when FIG. 12 and FIG. 9 are compared, in the Case 3, a value of the level ratio of the channel Ch3 deviates from a first specified range (8.17±15%) obtained from the values illustrated in FIG. 8, similarly, a value of Area_ACB_CV of the channel Ch3 deviates from a second specified range (3.6%+2%) obtained from the values illustrated in FIG. 8, and, further, similarly, a value of Area_SCB_CV of the channel Ch3 deviates from a second specified range (3.9%+2%) obtained from the values illustrated in FIG. 8. From the above, in the Case 3, it can be determined that there is an error in at least one of the filters 11-1, 11-4, and 11-5 disposed on an optical path to the photodetector of the channel Ch3.

1.8 Summary

As explained above, according to the present embodiment, since it is possible to verify a setting state of an optical filter from a level ratio and a CV (or an rCV) obtained using a test sample, it is possible to determine that the setting state of the optical filter is not appropriate not only when there is an artificial error, a mounting defect, or the like in the setting of the optical filter but also when the optical filter is, for example, damaged or deteriorated. As a result, it is possible to suppress deterioration in accuracy due to the optical filter.

2. Second Embodiment

Subsequently, a second embodiment is explained in detail with reference to the drawings. In the present embodiment, an entire operation including up to selection of an optical filter to be used for measurement of a sample for the purpose of assay/analysis, which is a pre-stage of the verification illustrated in the first embodiment, is explained with reference to an example.

2.1 Overall Flow

Figure 13:
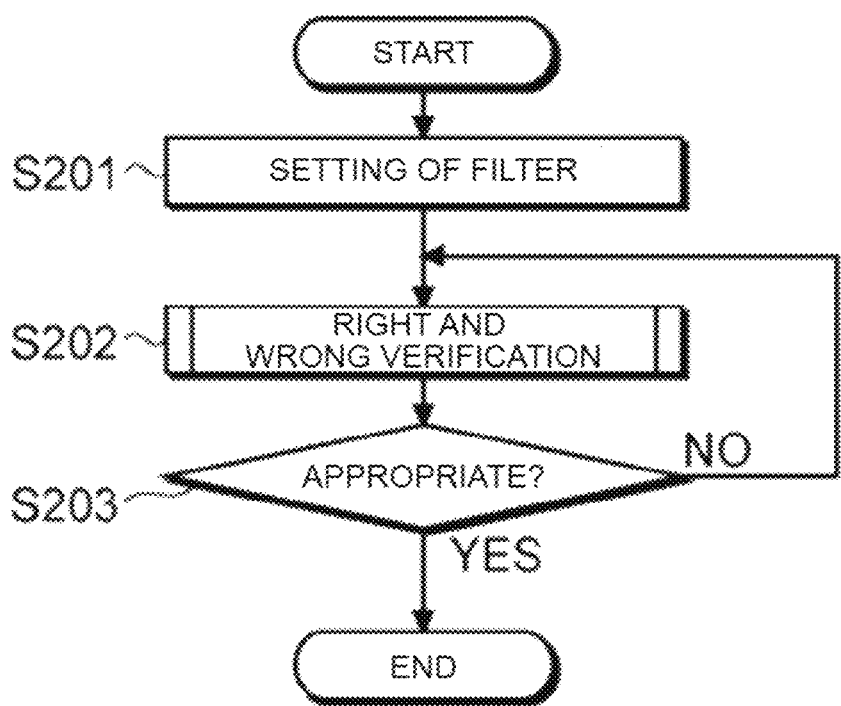
FIG. 13 is a diagram illustrating an example of a level ratio and a CV acquired in a case 3 of the verification according to the first embodiment of the present disclosure.

FIG. 13 is a flowchart illustrating an example of an overall flow according to the present embodiment.

(Step S201)

As illustrated in FIG. 13, in step S201 of the overall flow, the user sets, in, for example, the information processing unit 103 of the biological sample analysis device 100, an optical filter to be used for measurement of a sample as the optical filter in the detection unit 102 of the biological sample analysis device 100. As a setting procedure for the optical filter, the following procedure can be illustrated. In step S201, any one of procedures illustrated below may be executed.

First Example

In a first example, according to one or more dyes (hereinafter referred to as a dye set) to be used for staining a sample, an optical filter to be used in actual measurement and information concerning disposition of the optical filter (hereinafter referred to as optical filter pattern) are prepared in advance in the information processing unit 103. After determining a dye to be used for staining the sample or after staining the sample, the user selects one optical filter pattern to be used from a list of optical filter patterns given as choices from the information processing unit 103. The user sets, according to the selected optical filter pattern, optical filters corresponding to the optical filter pattern in sockets (sockets in which the optical filters are set) of the optical system in the detection unit 102 of the biological sample analysis device 100.

Figures 14, 15:
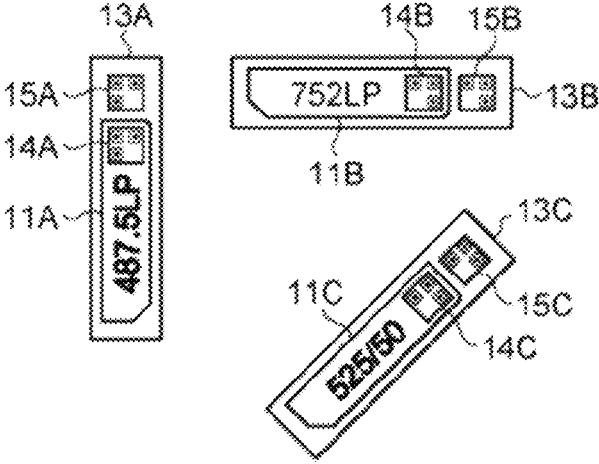
FIG. 14 is a diagram illustrating an example of a list of optical filter patterns provided to a user as selection candidates in a second embodiment of the present disclosure.
FIG. 15 is a diagram illustrating an example of an optical filter and a socket to which a QR code (registered trademark) is attached according to the second embodiment of the present disclosure.

Here, an example of the list of optical filter patterns provided to the user as selection candidates is illustrated in FIG. 14. As illustrated in FIG. 14, the list indicates, for each of optical filter patterns, which optical filters are set in which slots. Rows (records) in the list are, for example, user interfaces for selection by the user. The user can set an optical filter pattern to be used in the information processing unit 103 by selecting a row of the optical filter pattern to be used.

Second Example

In a second example, as in the first example, optical filter patterns for each of dye sets are prepared in advance in the information processing unit 103. However, in the second example, when the user inputs a dye to be used for staining a sample to the information processing unit 103, the information processing unit 103 automatically selects an optical filter pattern out of the stored optical filter patterns and presents information concerning the selected optical filter pattern to the user. In the second example, a list of optical filter patterns may be given to the user as choices such that the user can change the automatically selected optical filter pattern. Then, the user sets, according to the automatically selected or changed optical filter pattern, an optical filter corresponding to the optical filter pattern in the sockets of the optical system in the detection unit 102 of the biological sample analysis device 100.

Third Example

In a third example, the user himself or herself selects optical filters to be disposed in the sockets of the optical system in the detection unit 102 of the biological sample analysis device 100 and inputs the optical filters to the information processing unit 103 and sets the optical filters in the sockets of the optical system in the detection unit 102. For example, after determining a dye set to be used for staining a sample, the user determines a type and disposition of an optical filter to be used. For example, the information processing unit 103 provides, to the user, a user interface simulating the disposition of the optical system of the detection unit 102. The user sets optical filters to be disposed in the sockets of the optical system by using the user interface provided from the information processing unit 103. Then, the user sets, according to the disposition of the optical filters determined by the user, optical filters corresponding to the disposition in the sockets of the optical system in the detection unit 102 of the biological sample analysis device 100.

Fourth Example

In a fourth example, identification codes (an example of identification information retaining sections) for uniquely identifying optical filters are attached to the optical filters. The identification codes may be, for example, optically readable codes such as barcodes or QR codes (registered trademark). After setting the optical filters in the sockets, the user uses an optical reader such as a bar code reader or a QR code (registered trademark) reader to read the identification codes of the optical filters set in the sockets in a predetermined order. The read identification codes are input to the information processing unit 103. The information processing unit 103 specifies which optical filters are set in which sockets from the identification codes input in order.

Note that, in the fourth example, identification codes may be attached to the sockets in the optical system in addition to the optical filters. FIG. 15 illustrates an example in which QR codes (registered trademark) are attached to both the optical filters and the sockets. As illustrated in FIG. 15, QR codes (registered trademark) 14A to 14C and 15A to 15C are attached to both of respective optical filters 11A to 11C and respective sockets 13A to 13C. In that case, even when the user reads the identification codes of the sockets and the identification codes of the optical filters in random order by reading the respective QR codes (registered trademark) at the same time, the information processing unit 103 is capable of specifying which optical filters are set in which sockets.

In the fourth example, readers for reading the identification codes of the optical filters set in the sockets may be provided near the sockets. In this case, when the user sets the optical filters in the sockets and presses, for example, a completion button (a read button), the identification codes of the optical filters set in the sockets may be automatically read and transmitted to the information processing unit 103.

Fifth Example

In a fifth example, as in the fourth example, identification codes are attached to the optical filters. After setting the optical filters in the sockets, the user photographs the entire optical system using a portable terminal such as a cellular phone or a smartphone and inputs photographed image data to the information processing unit 103. As a method of inputting the image data, for example, various methods such as a method of attaching the image data to a mail and transmitting the image data and a method of uploading the image data from a dedicated application or a website may be adopted. The information processing unit 103 analyzes the image data input from the user to specify the optical filters set in the sockets of the optical system.

Sixth Example

In a sixth example, tags (an example of identification information retaining section) storing identification information for uniquely identifying the respective optical filters are attached to the optical filters. The tags may be a non-contact type such as RFID or a contact type. Readers for reading information stored in the tags attached to the optical filters set in the sockets are provided in the sockets of the optical system. When the user sets the optical filters in the sockets, information indicating which optical filters are set in which sockets is automatically or manually input to the information processing unit 103.

Note that, in step S201, besides the setting information of the optical filters, lot information of setup beads to be used for verification may be input to the information processing unit 103. The lot information may be directly input to the information processing unit 103 by the user or may be input to the information processing unit 103 using a portable terminal such as a cellular phone or a smartphone.
(Step S202)

In step S202, for example, the setting states of the optical filters are verified by executing the verification flow explained with reference to FIG. 7 in the first embodiment.
(Step S203).

In step S203, it is determined whether the setting states of the optical filters are appropriate as a result of the verification in step S202. When the setting states are not appropriate (NO in step S203), the flow returns to step S201 and the setting of the optical filters is executed again. On the other hand, when the setting states are appropriate (YES in step S203), this flow is ended and measurement for the assay/analysis target sample is executed.

3. Third Embodiment

Subsequently, a third embodiment is explained in detail with reference to the drawings. In the present embodiment, the information presented to the user when the check of the setting state of the optical filter and the redoing of the setting of the optical filter are notified to the user explained with reference to step S112 in FIG. 7 in the first embodiment is explained with reference to an example. Note that types and disposition of the optical filters in the optical system of the detection unit 102 may be set in the information processing unit 103 by, for example, the procedure illustrated in the second embodiment.

In step S112 in FIG. 7, in addition to or instead of the information for instructing "the check of the setting state of the optical filter and the redoing of the setting of the optical filter" to the user, information for specifying an optical filter, a setting state of which is estimated as not being appropriate, may be notified to the user.

The information for specifying an optical filter, a setting state of which is estimated as not being appropriate, can be various types of information such as information indicating a specific optical filter and information indicating an optical path to a photodetector corresponding to a channel determined as not being appropriate in verification and/or information indicating an optical filter disposed on the optical path.

Figure 16:
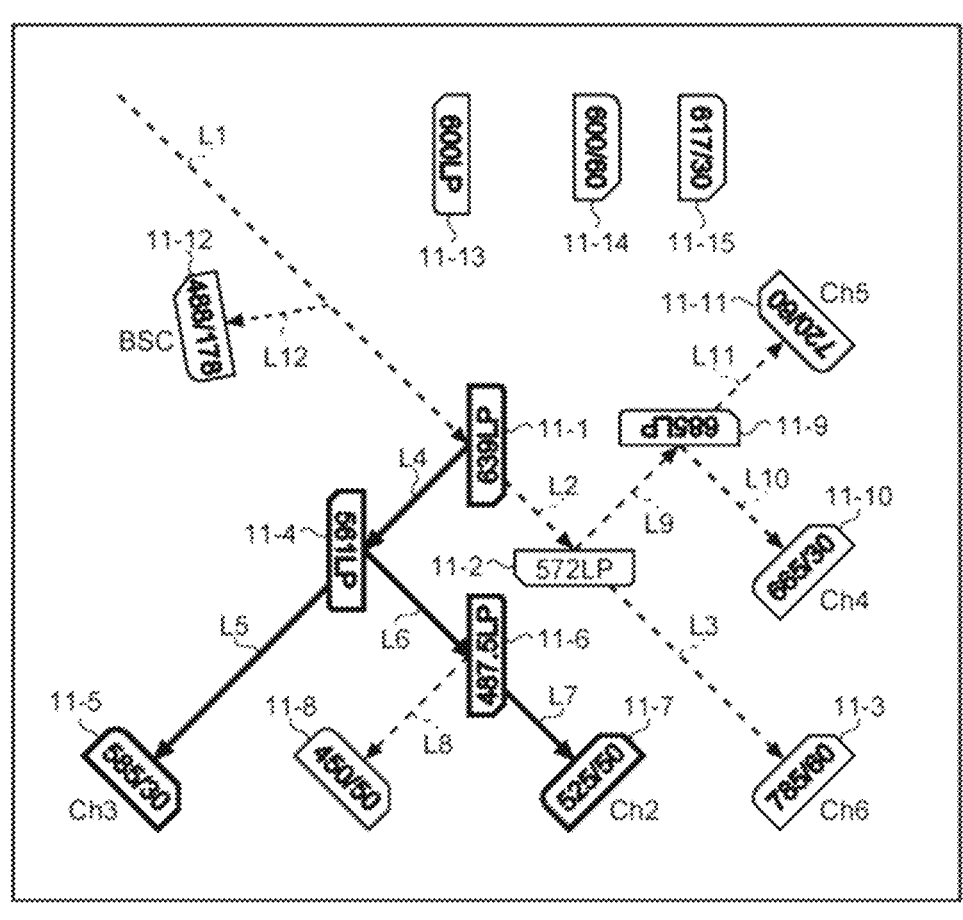
FIG. 16 is a diagram illustrating an example of a notification screen notified to a user according to a third embodiment of the present disclosure.

FIG. 16 is a schematic diagram illustrating an example of a screen (hereinafter referred to as notification screen) presented to the user as "the information for specifying an optical filter, a setting state is estimated as not being appropriate". Note that, in this example, the case 2 (FIG. 11) in the first embodiment, that is, the case in which the filter 11-5 and the filter 11-7 are interchanged is illustrated.

As illustrated in FIG. 16, on the notification screen provided to the user in the present embodiment, optical paths to the photodetectors equivalent to the channels Ch2 and Ch3 determined as not being appropriate in the verification are expressed by visual effects such as thick lines, highlighted colors, and blinking. In this example, an optical path from the filter 11-1 to the channel CH2 and an optical path from the filter 11-1 to the channel Ch3 are expressed by thick lines. Therefore, the user provided with the notification screen can recognize that a setting state of any one or more of the filters 11-1, 11-4, 11-5, 11-6, and 11-7 located on the optical paths from the filter 11-1 to the channels Ch2 and Ch3 is not appropriate.

Note that the notification screen may be displayed on a display that can be checked by the user such as a display included in the information processing unit 103 or connected to the information processing unit 103 or a portable terminal carried by the user.

4. Modifications

In the embodiments explained above, the flow cytometer is exemplified as the biological sample analysis device 100. However, the technique according to the present disclosure is not limited to the flow cytometer and can be applied to various analysis devices using two or more optical filters for demultiplexing light from a sample into light in two or more wavelength bands such as a microscope or an image cytometer. In that case, the sample is not limited to microparticles and can be various objects such as tissue sections. Similarly, as the test sample, instead of the setup beads, two or more kinds of objects having different fluorescence intensities and scattered light intensities can be used.

5. Hardware Configuration

Figure 17:
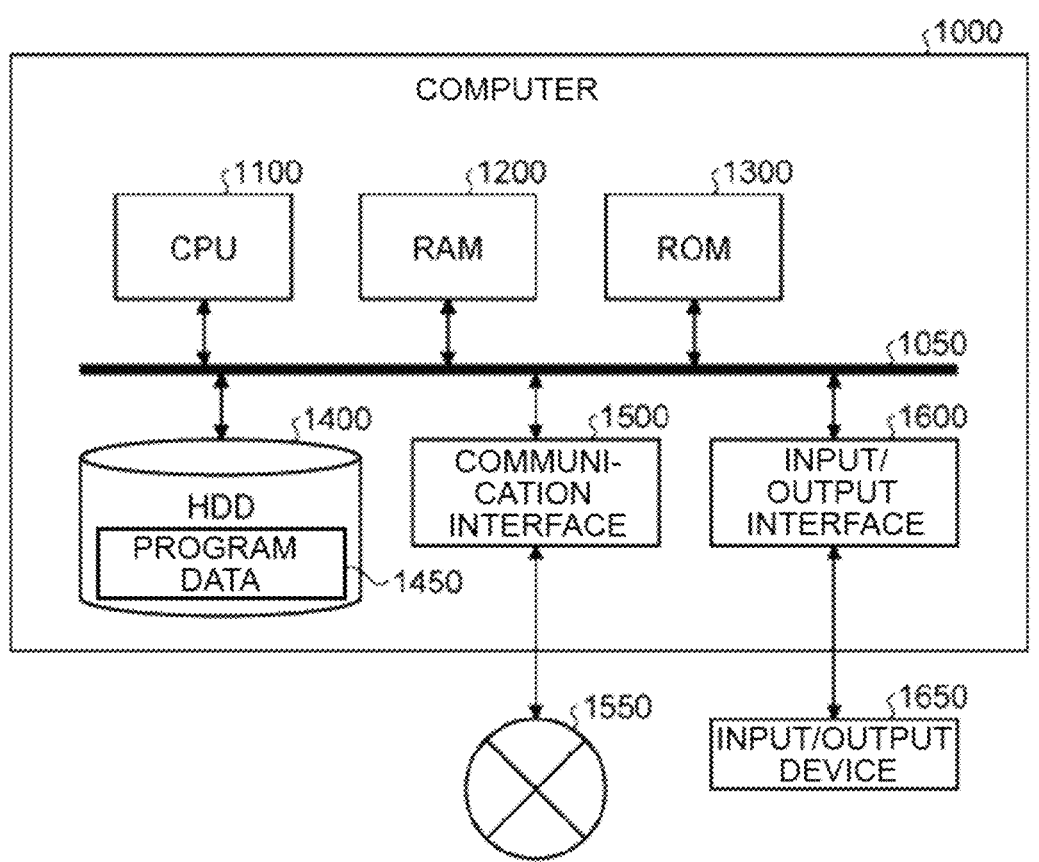
FIG. 17 is a hardware configuration diagram illustrating an example of a computer that implements functions of an information processing device according to the present disclosure.

The information processing unit 103 according to the embodiments explained above can be implemented by, for example, a computer 1000 having a configuration as illustrated in FIG. 17. FIG. 17 is a hardware configuration diagram illustrating an example of the computer 1000 that implements the functions of the information processing unit 103. The computer 1000 includes a CPU 1100, a RAM 1200, a ROM (Read Only Memory) 1300, an HDD (Hard Disk Drive) 1400, a communication interface 1500, and an input/output interface 1600. The units of the computer 1000 are connected by a bus 1050.

The CPU 1100 operates based on programs stored in the ROM 1300 or the HDD 1400 and controls the units. For example, the CPU 1100 develops the programs stored in the ROM 1300 or the HDD 1400 in the RAM 1200 and executes processing corresponding to various programs.

The ROM 1300 stores a boot program such as a BIOS (Basic Input Output System) to be executed by the CPU 1100 at a start time of the computer 1000, a program depending on hardware of the computer 1000, and the like.

The HDD 1400 is a computer-readable recording medium that non-transiently records a program to be executed by the CPU 1100, data to be used by such a program, and the like. Specifically, the HDD 1400 is a recording medium that records a program for realizing the operations according to the present disclosure, which is an example of program data 1450.

The communication interface 1500 is an interface for the computer 1000 to be connected to an external network 1550 (for example, the Internet). For example, the CPU 1100 receives data from other equipment and transmits data generated by the CPU 1100 to the other equipment via the communication interface 1500.

The input/output interface 1600 is a component including an I/F unit 18 explained above and is an interface for connecting an input/output device 1650 and the computer 1000. For example, the CPU 1100 receives data from an input device such as a keyboard or a mouse via the input/output interface 1600. The CPU 1100 transmits data to an output device such as a display, a speaker, or a printer via the input/output interface 1600. The input/output interface 1600 may function as a media interface that reads a program or the like recorded in a predetermined recording medium (a medium). The medium is, for example, an optical recording medium such as a DVD (Digital Versatile Disc) or a PD (Phase change rewritable Disk), a magneto-optical recording medium such as an MO (Magneto-Optical disk), a tape medium, a magnetic recording medium, or a semiconductor memory.

For example, when the computer 1000 functions as the information processing unit 103 according to the embodiments explained above, the CPU 1100 of the computer 1000 realizes the function of the information processing unit 103 by executing the program loaded on the RAM 1200. A program and the like according to the present disclosure are stored in the HDD 1400. Note that the CPU 1100 reads the program data 1450 from the HDD 1400 and executes the program data. However, as another example, the CPU 1100 may acquire these programs from another device via the external network 1550.

Although the embodiments of the present disclosure are explained above, the technical scope of the present disclosure is not limited to the embodiments explained above per se. Various changes are possible without departing from the gist of the present disclosure. Components in different embodiments and modifications may be combined as appropriate.

The effects in the embodiments described in this specification are only illustrations and are not limited. Other effects may be present.

Note that the present technique can also take the following configurations.

(1)

An information processing device including:
an irradiation unit that irradiates a sample with light;
an optical system that demultiplexes fluorescence from the sample using two or more optical filters;
a plurality of photodetectors that detect intensities of respective pieces of fluorescence demultiplexed by the optical system; and
a processing unit that analyzes the sample based on the intensities of the pieces of fluorescence detected by the photodetector respectively, wherein
the processing unit determines, based on first light intensities for each of the test samples detected by the photodetector respectively via the optical system when the two or more types of test samples are irradiated with the light from the irradiation unit, whether setting states of the two or more optical filters are appropriate.

(2)

The information processing device according to (1), wherein the processing unit determines, based on a ratio of the first light intensities for each of the test samples, whether the setting states of the two or more optical filters are appropriate.

(3)

The information processing device according to (2), where the processing unit determines, based on whether the ratio of the first light intensities is included in a first predetermined range based on a ratio of second light intensity for each of the test samples detected by the photodetector respectively via the optical system when the two or more types of test samples are irradiated with the light from the irradiation unit in a state in which setting of the two or more optical filters is appropriate, whether setting states of the two or more optical filters are appropriate.

(4)

The information processing device according to any one of (1) to (3), wherein the processing unit determines, based on an average value or a median value of the first light intensities detected by two or more of the plurality of photodetectors, whether setting states of the two or more optical filters is appropriate.

(5)

The information processing device according to any one of (2) to (4), wherein the processing unit determines, based on a coefficient of variation or a robust coefficient of variation of the first light intensities detected by the photodetector respectively, whether the setting states of the two or more optical filters are appropriate.

(6)

The information processing device according to (5), wherein the processing unit determines, based on whether the coefficient of variation or the robust coefficient of variation of the first light intensities is included in a second predetermined range based on a coefficient of variation or a robust coefficient of variation of second light intensities for each of the test samples detected by the photodetector respectively via the optical system when the two or more types of test samples are irradiated with the light from the irradiation unit in a state where the setting of the two or more optical filters is appropriate, whether the setting states of the two or more optical filters are appropriate.

(7)

The information processing device according to any one of (1) to (6), wherein, when determining that the setting states of the two or more optical filters are not appropriate, the processing unit notifies a user that a setting state of at least one optical filter among the two or more optical filters is not appropriate.

(8)

The information processing device according to (7), wherein the processing unit notifies, based on the first light intensities for each of the test samples detected by each of the respective photodetectors, a user of one or more optical filters, setting states of which are estimated as not being appropriate, or an optical path on which the one or more optical filters, the setting states of which are estimated as not being appropriate, are disposed.

(9)

The information processing device according to (8), wherein the processing unit notifies, based on types and disposition of the two or more optical filters in the optical system set by the user, the user of the one or more optical filters, the setting states of which are estimated as not being appropriate, or the optical path on which the one or more optical filters, the setting states of which are estimated as not being appropriate, are disposed.

(10)

The information processing device according to (9), wherein the processing unit presents, to the user, candidates of types and disposition of the two or more optical filters to be set in the optical system according to a dye used for staining the sample and notifies, based on types and disposition of the two or more optical filters selected by the user out of the candidates, the user of the one or more optical filters, the setting states of which are estimated as not being appropriate, or the optical path on which the one or more optical filters, the setting states of which are estimated as not being appropriate, are disposed.

(11)

The information processing device according to (9), wherein the processing unit automatically sets types and disposition of the two or more optical filters to be set in the optical system according to a dye used for staining the sample input from the user and notifies, based on the automatically set types and disposition of the two or more optical filters, the user of the one or more optical filters, the setting states of which are estimated as not being appropriate, or the optical path on which the one or more optical filters, the setting states of which are estimated as not being appropriate, are disposed.

(12)

The information processing device according to (9), wherein the respective optical filters include identification information retaining sections that retain identification information for uniquely identifying types of the optical filters, and the processing unit notifies, based on types of the respective optical filters and disposition of the respective optical filters acquired from the identification information retaining sections of the respective optical filters, the user of the one or more optical filters, the setting states of which are estimated as not being appropriate, or the optical path on which the one or more optical filters, the setting states of which are estimated as not being appropriate, are disposed.

(13)

The information processing device according to any one of (1) to (12), wherein the sample is microparticles, and the two or more types of test samples are setup beads including two or more types of beads having different sizes.

(14)

The information processing device according to any one of (1) to (13), wherein the irradiation unit irradiates the sample or the test sample flowing on a predetermined flow channel with the light.

(15)

An information processing method including:

irradiating two types of test samples with light, detecting intensities of respective pieces of fluorescence demultiplexed by an optical system that demultiplexes pieces of fluorescence from the each of two types of test samples using two or more optical filters; and determining whether setting states of the two or more optical filters are appropriate based on the detected intensities of the pieces of fluorescence for each of the test samples.

(16)

A program for causing a processor of an information processing device to function, the information processing device including: an irradiation unit that irradiates a sample with light; an optical system that demultiplexes fluorescence from the sample using two or more optical filters; and a plurality of photodetectors that detect intensities of respective pieces of fluorescence demultiplexed by the optical system, the program causing the processor to determine, based on first light intensities for each of the test samples detected by the photodetector respectively via the optical system when two or more types of test samples are irradiated with the light from the irradiation unit, whether setting states of the two or more optical filters are appropriate.

REFERENCE SIGNS LIST

11A to 11C, 11a to 11c, 11-1 to 11-15 FILTER
12a to 12c, PHOTODETECTOR
13A to 13C SOCKET
14A to 14C, 15A to 15C QR CODE (REGISTERED TRADEMARK)
100 BIOLOGICAL SAMPLE ANALYSIS DEVICE
101 LIGHT IRRADIATION UNIT
102 DETECTION UNIT
103 INFORMATION PROCESSING UNIT
104 SORTING UNIT
C FLOW CHANNEL
L1 to L15 LIGHT
P BIOPARTICLE
S BIOLOGICAL SAMPLE

The invention claimed is:

1. An information processing device including:
an irradiation unit that irradiates a sample with light;
an optical system that demultiplexes fluorescence from the sample using two or more optical filters;
a plurality of photodetectors that detect intensities of respective pieces of fluorescence demultiplexed by the optical system; and
a processing unit that analyzes the sample based on the intensities of the pieces of fluorescence detected by the photodetector respectively, wherein
the processing unit determines, based on first light intensities for each of two or more types of test samples detected by the photodetector respectively via the optical system when the two or more types of test samples are irradiated with the light from the irradiation unit, whether setting states of the two or more optical filters are appropriate,
wherein the processing unit determines, based on a ratio of the first light intensities for each of the two or more types of test samples, whether the setting states of the two or more optical filters are appropriate; and
the processing unit determines, based on a coefficient of variation or a robust coefficient of variation of the first light intensities detected by the photodetector respectively, whether the setting states of the two or more optical filters are appropriate.

2. The information processing device according to claim 1, where the processing unit determines, based on whether the ratio of the first light intensities is included in a first predetermined range based on a ratio of second light intensity for each of the two or more types of test samples detected by the photodetector respectively via the optical system when the two or more types of test samples are irradiated with the light from the irradiation unit in a state in which setting of the two or more optical filters is appropriate, whether the setting states of the two or more optical filters are appropriate.

3. The information processing device according to claim 1, wherein the processing unit determines, based on an average value or a median value of the first light intensities detected by two or more of the plurality of photodetectors, whether the setting states of the two or more optical filters is appropriate.

4. The information processing device according to claim 1, wherein the processing unit determines, based on whether the coefficient of variation or the robust coefficient of variation of the first light intensities is included in a second predetermined range based on a coefficient of variation or a robust coefficient of variation of second light intensities for each of the two or more types of test samples detected by the photodetector respectively via the optical system when the two or more types of test samples are irradiated with the light from the irradiation unit in a state where the setting of the two or more optical filters is appropriate, whether the setting states of the two or more optical filters are appropriate.

5. The information processing device according to claim 1, wherein, when determining that the setting states of the two or more optical filters are not appropriate, the processing unit notifies a user that the setting state of at least one optical filter among the two or more optical filters is not appropriate.

6. The information processing device according to claim 5, wherein the processing unit notifies, based on the first light intensities for each of the two or more types of test samples detected by each of the respective photodetectors, the user of one or more optical filters, the setting states of which are estimated as not being appropriate, or an optical path on which the one or more optical filters, the setting states of which are estimated as not being appropriate, are disposed.

7. The information processing device according to claim 6, wherein the processing unit notifies, based on types and disposition of the two or more optical filters in the optical system set by the user, the user of the one or more optical filters, the setting states of which are estimated as not being appropriate, or the optical path on which the one or more optical filters, the setting states of which are estimated as not being appropriate, are disposed.

8. The information processing device according to claim 7, wherein the processing unit presents, to the user, candidates of the types and the disposition of the two or more optical filters to be set in the optical system according to a dye used for staining the sample and notifies, based on the types and the disposition of the two or more optical filters selected by the user out of the candidates, the user of the one or more optical filters, the setting states of which are estimated as not being appropriate, or the optical path on which the one or more optical filters, the setting states of which are estimated as not being appropriate, are disposed.

9. The information processing device according to claim 7, wherein the processing unit automatically sets the types and the disposition of the two or more optical filters to be set in the optical system according to a dye used for staining the sample input from the user and notifies, based on the automatically set types and disposition of the two or more optical filters, the user of the one or more optical filters, the setting states of which are estimated as not being appropriate, or the optical path on which the one or more optical filters, the setting states of which are estimated as not being appropriate, are disposed.

10. The information processing device according to claim 7, wherein the respective optical filters include identification information retaining sections that retain identification information for uniquely identifying the types of the optical filters, and the processing unit notifies, based on the types of the respective optical filters and the disposition of the respective optical filters acquired from the identification information retaining sections of the respective optical filters, the user of the one or more optical filters, the setting states of which are estimated as not being appropriate, or the optical path on which the one or more optical filters, the setting states of which are estimated as not being appropriate, are disposed.

11. The information processing device according to claim 1, wherein the test sample is microparticles, and the two or more types of test samples are setup beads including two or more types of beads having different sizes.

12. The information processing device according to claim 1, wherein the irradiation unit irradiates the sample or the test sample flowing on a predetermined flow channel with the light.

13. An information processing method including:

irradiating two types of test samples with light, detecting intensities of respective pieces of fluorescence demultiplexed by an optical system that demultiplexes pieces of fluorescence from each of two types of test samples using two or more optical filters; and determining whether setting states of the two or more optical filters are appropriate based on a ratio of the first light intensities for each of the two types of test samples and a coefficient of variation or a robust coefficient of variation of first light intensities detected by a photodetector respectively.

14. A non-transitory computer readable medium configured for causing a processor of an information processing device to function, the information processing device including: an irradiation unit that irradiates a sample with light; an optical system that demultiplexes fluorescence from the sample using two or more optical filters; and a plurality of photodetectors that detect intensities of respective pieces of fluorescence demultiplexed by the optical system, the non-transitory computer-readable medium causing the processor to determine, based on a ratio of the first light intensities for each of two or more types of test samples and a coefficient of variation or a robust coefficient of variation of first light intensities for each of the two or more types of test samples detected by the photodetector respectively via the optical system when the two or more types of test samples are irradiated with the light from the irradiation unit, whether setting states of the two or more optical filters are appropriate.

\* \* \* \* \*